Oct. 17, 1967     F. KRAISSL, JR     3,347,386
MULTIPLE ELEMENT FILTER ASSEMBLY
Filed Sept. 9, 1964     3 Sheets-Sheet 1
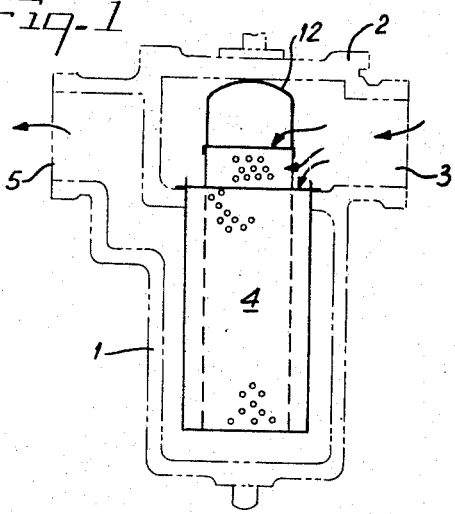
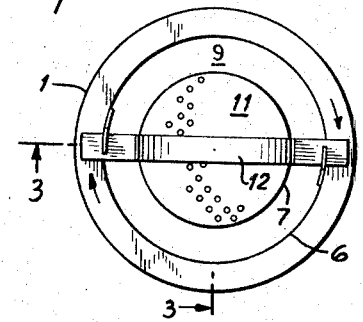
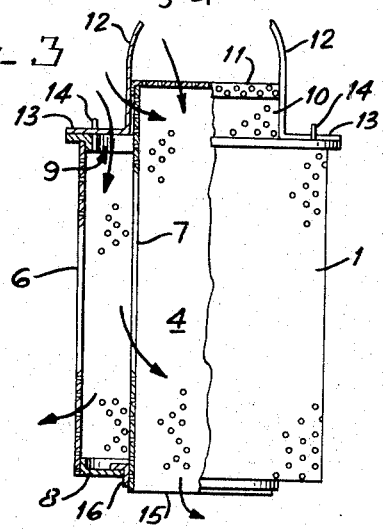
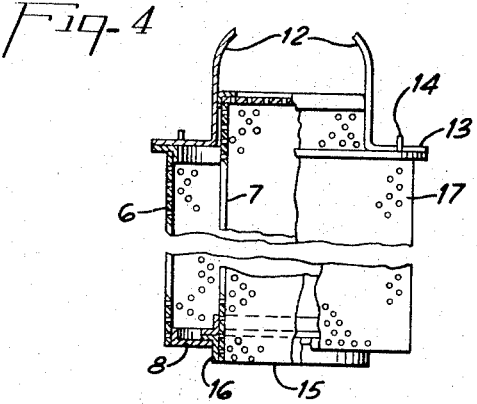
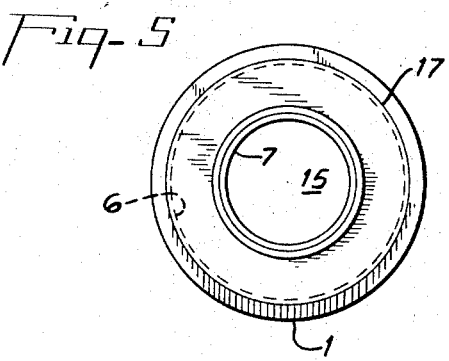
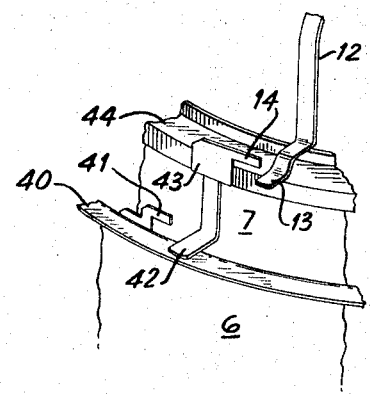
INVENTOR.
FREDERICK KRAISSL, JR.
BY
Bierman + Bierman
ATTORNEYS Oct. 17, 1967 F. KRAISSL, JR 3,347,386
MULTIPLE ELEMENT FILTER ASSEMBLY
Filed Sept. 9, 1964 3 Sheets-Sheet 2
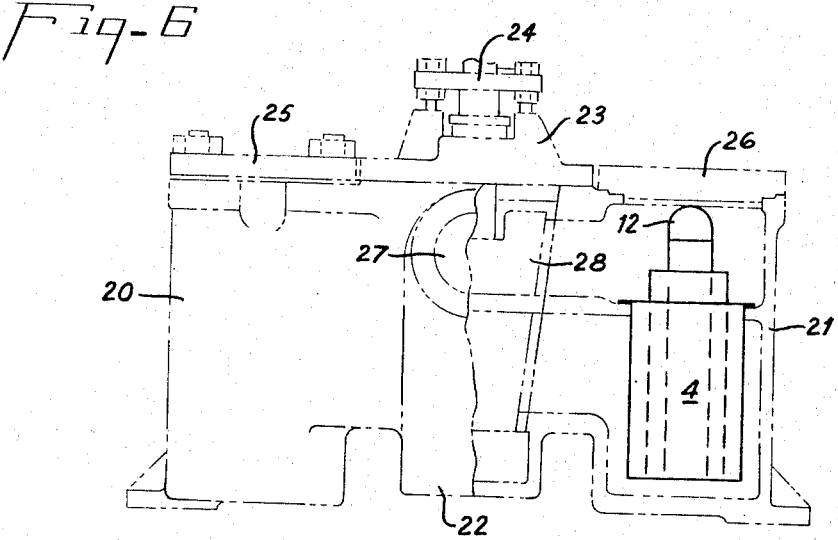
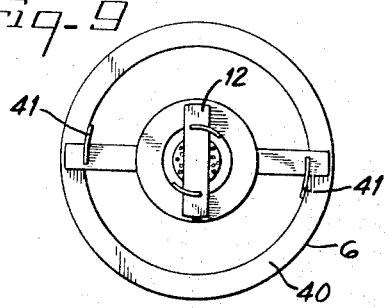
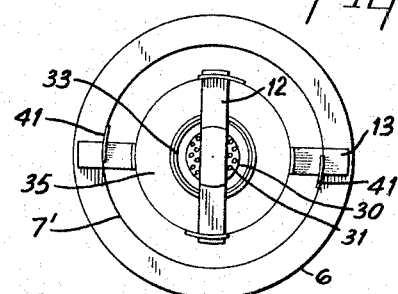
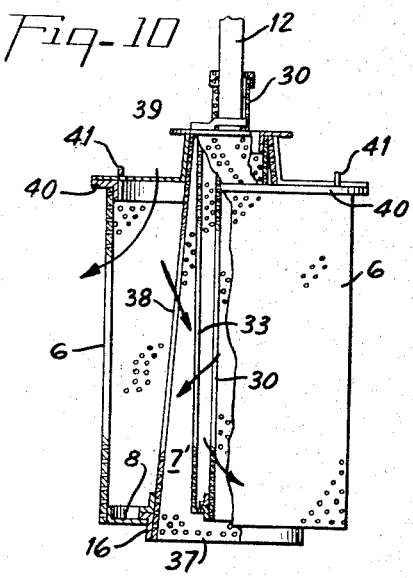
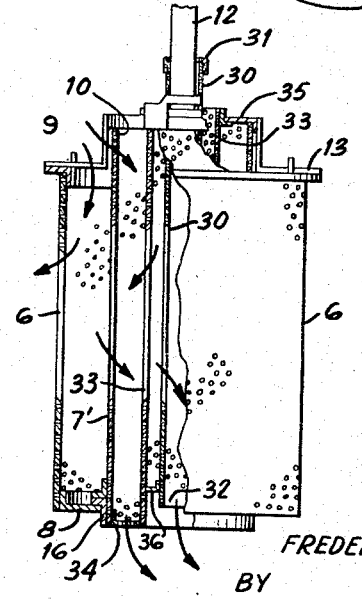
INVENTOR.
FREDERICK KRAISSL, JR.
BY
Bierman + Bierman
ATTORNEYS Oct. 17, 1967  F. KRAISSL, JR  3,347,386
MULTIPLE ELEMENT FILTER ASSEMBLY
Filed Sept. 9, 1964  3 Sheets-Sheet 3

INVENTOR.
FREDERICK KRAISSL, JR.
BY
Bierman & Bierman
ATTORNEYS

United States Patent Office 3,347,386
Patented Oct. 17, 1967

3,347,386
MULTIPLE ELEMENT FILTER ASSEMBLY
Frederick Kraissl, Jr., 244 Kinderkamack Road,
North Hackensack, N.J. 07661
Filed Sept. 9, 1964, Ser. No. 395,157
16 Claims. (Cl. 210—238)

ABSTRACT OF THE DISCLOSURE

A multiple element filter assembly having one element extending substantially above another, said one element having an L-shaped latch thereon which extends downwardly and almost touches the other element, said latch entering an open ended keeper attached to said other element to secure the elements together; and another multiple element assembly having the bottom part of the inner element extending through a bottom flange of the outer element, and the top of said inner element spaced a substantial distance below the top of the outer element by a strap fastened to the inner element and resting on the top of the outer element, the tops of the elements having a magnet therebetween.

---

The present invention is directed to strainers, filters or separators for removing suspended matter from fluids, such as air or lubricating oils.

In my Patent No. 2,792,118 issued May 14, 1957, I have shown several forms of such a device. It has proved to be feasible for the intended purpose and it has operated successfully. However, it is desirable to improve the effectiveness thereof and the present invention is intended and adapted to introduce modifications of the structure which will increase the capacity and efficiency thereof in its filtering function.

The improvement includes providing a multi-element filter having two or more substantially cylindrical strainers or screens in concentric arrangement. The top of each inner strainer or screen extends a substantial distance above or below the adjacent outer strainer or screen, whereby a greater screen area is exposed to the incoming fluid, reducing the resistance to flow and increasing the efficiency of the filter. Locking or latching means are provided at the upper portions of the adjacent screens so that they are held in their proper relative positions, but each is readily removable for cleaning or replacement. According to another feature, a single casing has a pair of such units with a common entrance and exit. As a whole, the area for the inlet of the fluid is equal to or greater than the area for the exit thereof, thus minimizing or eliminating back pressures in the filter and obtaining free flow therethrough.

The invention is more fully described in connection with the accompanying drawings constituting a part hereof, in which like reference characters indicate like parts, and in which:

FIG. 1 is a vertical cross-sectional view of one form of the improvement of the present invention;

FIG. 2 is a top plan view thereof;

FIG. 3 is a front elevational view, some parts being shown in section;

FIG. 4 is a fragmentary view similar to FIG. 3;

FIG. 5 is a bottom view of the structure of FIG. 4;

FIG. 6 is a front elevational view of a dual filter, some parts being broken away for clearness;

FIG. 7 is a top plan view of a modified form in which are incorporated four cylindrical concentric screens;

FIG. 8 is a side elevational view of the device of FIG. 7, some parts being shown in section;

FIG. 9 is a top plan view of a further modified form;

FIG. 10 is a side elevational view of the form shown in FIG. 9, some parts being broken away to show the tapered element;

FIG. 11 is an enlarged fragmentary view showing the locking or latching arrangement between adjacent screens;

Figure 12:
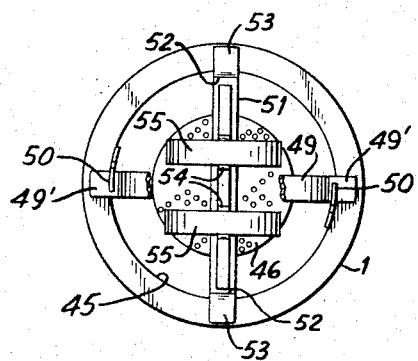
FIG. 12 is a top plan view of a modified form of the invention.

Referring to FIG. 1, there is provided a casing 1 having a cap or cover 2 suitably held on the casing. An inlet 3 allows fluid to flow thru filter 4 and then out thru exit 5.

The structure of filter 4 is shown in FIGS. 2 and 3. There is an outer screen 6 with an inner adjacent screen 7 concentric therewith, and a barrier 8 therebetween at the bottom thereof. At the top in the space between screens 6 and 7 is a mesh or similar means 9 to allow ingress of fluid. Screen 7 extends above the top of screen 6 as shown at 10 and a screen cover 11 on top thereof allows fluid to flow into the filter. Handle 12 on top of the unit bears against cover 2 and is held in operative position. Ends 13 of handle 12 cooperate with keepers or latches 14.

In FIGS. 4 and 5 is shown the cooperative positions of the lower ends of the filters. End 15 of screen 7 fits into flange or ring 16 carried by the lower end of screen 6. Around and in contact with screen 6 is perforated sheet 17 which serves to support and strengthen screen 6.

Referring to FIG. 6, the casing consists of two units 20 and 21 in horizontal alinement. Each unit carries a screen 4 or one of the herein described modifications thereof. The units are joined by the connecting portion 22, which is closed by cover 23 held in place by element 24. Covers 25 and 26 close the tops of units 20 and 21 respectively. An inlet 27 is provided for entrance of fluid to each of the filters thru ducts 28. On the opposite side of connecting portion 22 is an exit arrangement similar to 27–28.

In FIGS. 7 and 8 is shown a quadruple screen element. There is provided a third screen 30 concentric with and within screens 6 and 7', the top 31 and bottom 32 being screens. A fourth screen 33 is located between screens 30 and 7', the bottom 34 and top 35 being screens joining the same. The flow of fluid thru the filter is shown by arrows.

The total open areas of fluid passage are intended to be substantially the same or greater than the normal area of the pipe size to preclude restricted flow. This is important in making use of straining, filtering or separating areas not previously utilized.

As shown in FIGS. 9 and 10, there are four screens as in FIGS. 7 and 8 with the difference that screen 7' has been modified. The bottom 37 thereof is held in flange or ring 16 and it tapers inwardly and upwardly as shown at 38 meeting screen 33 at 39. The taper may be reversed. It permits freer flow of fluid thru the filter.

The latching means is shown in FIG. 11. While it is applied to the form shown in FIGS. 1–3, it is applicable to the other modifications as well. On rim 40 of screen 6 is a hook or keeper 41. A latch 42 is attached at 43 to rim 44 of screen 7. From point 43 extends hook or keeper 14 into which latch 13 of handle 12 fits to hold screens 6 and 7 in their proper relative positions in cooperation with ring or flange 16.

In the several forms of the invention, because of the plurality of filters and the arrangement thereof, a large area is exposed to the entrance and exit of fluid to be filtered. The very large filtration area insures a minimum of resistance to flow and a maximum of filtering action. Although there have been described several forms of the invention, they are intended to illustrate the many possible forms within the spirit and scope of the invention.

Figure 13:
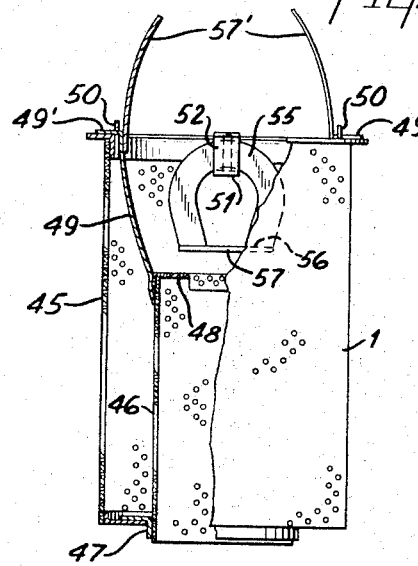
FIG. 13 is a side view of FIG. 12.
Figure 14:
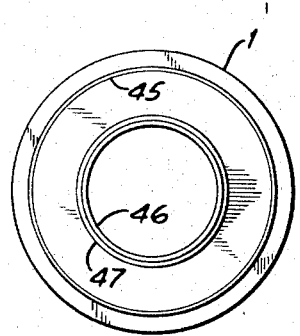
FIG. 14 is a bottom view of FIG. 13.

In FIGS. 12–14, within casing 1 is a cylindrical screen 45, and concentric therewith is screen 46, the lower end of which is held in circular flange 47 in the bottom of screen 45. The top 48 of screen 46 is a substantial distance below the top of screen 45. Straps 49 extend to the top of screen 45 and are bent over at 49' to rest on top of screen 45. A latch 50 holds straps 49 and screen 46 in adjusted position.

Bar 51 has near its opposite ends downwardly extending members 52 so located and of springy metal that they contact the inner face of screen 45 with sufficient pressure to hold bar 51 in position. Ends 53 of bar 51 rest on top of screen 45. Formed in an intermediate portion of bar 51 are grooves or recesses 54 into which permanent magnets 55 are held with their poles 56 facing the top of screen 46. A pole piece 57 may be provided. In this arrangement, magnetic particles passing thru the filter will be intercepted en route. The handles are 57'.

Figure 15:
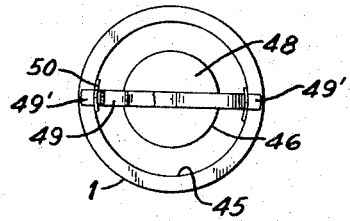
FIG. 15 is a top plan view of another form of the invention.
Figure 16:
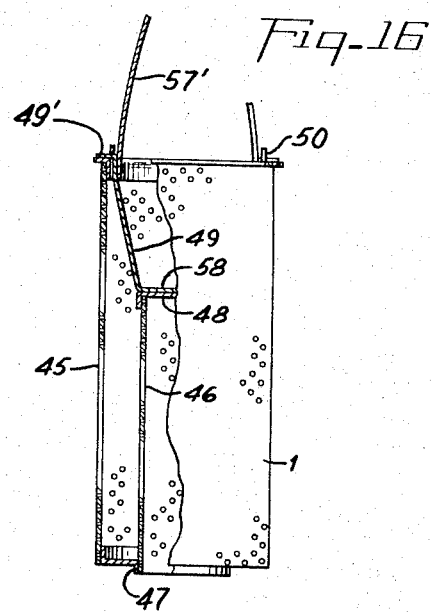
FIG. 16 is a side view of FIG. 15.

FIGS. 15 and 16 illustrate a form of the invention quite similar to FIGS. 12–14 but omitting the arrangement of magnets. This form is of a filter of small diameter and relative great length. Instead of a pair of straps 49 on opposite sides of screen 46 of FIG. 13, there is a single strap 58 having end portions 49' and the integral horizontal portion is secured to the top of screen 46.

Figure 17:
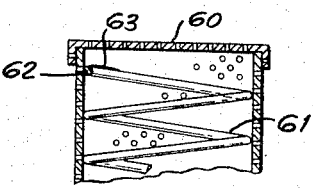
FIG. 17 is a fragmentary view of a reinforced structure of the screen.

In FIG. 17, is shown a means of protecting the screen, and it is applicable to all of the screens used in the structure. It frequently occurs that the screen becomes clogged during the filtering operation, which builds up a differential presure causing collapse of the screen. Screen 60 is a typical screen and on the inner cylindrical portion thereof a spiral spring is inserted. It is preferably under compression so that it bears on the screen as shown at 62 with sufficient pressure to counteract the outside pressure, at least to partially nullify the tendency of the screen to collapse. The upper and lower ends 63 of the spring may be soldered or brazed to the inside of the screen to hold it in position.

Various changes may be made in the materials of construction, the relative positions of the elements, the forms of the screens and other elements, the size of the parts, and other details. In view thereof, the invention is to be broadly construed and not to be limited except by the character of the claims appended hereto. Throughout the claims, the word "filter" is intended to include strainers and separators, as well as other devices having similar functions.

What is claimed is:

1. In a fluid filter or separator having a casing, a filter body therein, inlet and outlet opening in said casing for passage of fluid therethrough, the improvement which comprises said body having an outer cylindrical screen, an adjacent screen concentric therewith and within the same, the top of said adjacent screen extending substantially above said outer screen, an open-ended keeper extending upwardly from the top of said outer screen, an L-shaped latch secured to the top of said inner screen and extending downwardly to the top of said outer screen with its horizontal leg directed outwardly radially and practically in contact with said outer screen, said latch adapted to enter said open end.

2. In a fluid filter or separator having a casing, a filter body therein, inlet and outlet opening in said casing for passage of fluid therethrough, the improvement which comprises said body having an outer cylindrical screen, an adjacent screen concentric therewith and within the same, the top of said adjacent screen extending substantially above said outer screen, an open-ended keeper extending upwardly from the top of said outer screen an L-shaped latch secured to the top of said inner screen and extending downwardly to the top of said outer screen with its horizontal leg directed outwardly radially and practically in contact with said outer screen, said latch adapted to enter said open end, a third screen within said adjacent screen and concentric with said adjacent screen, the top of said third screen extending substantially above said adjacent screen.

3. In a fluid filter or separator having a casing, a filter body therein, inlet and outlet opening in said casing for passage of fluid therethrough, the improvement which comprises said body having an outer cylindrical screen, an adjacent screen concentric therewith and within the same, the top of said adjacent screen extending substantially above said outer screen, an open-ended keeper extending upwardly from the top of said outer screen, an L-shaped latch secured to the top of said inner screen and extending downwardly to the top of said outer screen with its horizontal leg directed outwardly radially and practically in contact with said outer screen, said latch adapted to enter said open end, a third screen within said adjacent screen and concentric with said adjacent screen, the top of said third screen extending substantially above said adjacent screen, a fourth screen within said adjacent screen and concentric and coextensive therewith, said adjacent and fourth screens being united at their ends.

4. A filter according to claim 1 characterized in that a barrier is located at the bottom of said screens between said outer and adjacent screens, said barrier preventing flow of fluid between the outer and the adjacent screen.

5. A filter according to claim 2 characterized in that a barrier is located at the bottom of said screens between said adjacent and third screens, said barrier preventing flow of fluid between the outer and the adjacent screen.

6. A filter according to claim 3 characterized in that a barrier is located at the bottom of said screens between said adjacent and fourth screens, said barrier preventing flow of fluid between the outer and the adjacent screen.

7. A filter according to claim 1 characterized in that said adjacent screen is tapered inwardly from the lower portion thereof to the upper portion to provide a wide area at said upper portion for the entrance of fluid.

8. A filter according to claim 3 characterized in that said adjacent screen is tapered from the lower portion thereof to the upper portion.

9. A filter or separator having a casing, a filter body therein, inlet aud outlet opening in said casing for passage of fluid therethrough, the improvement which comprises said body having an outer cylindrical screen, an inner spaced adjacent screen concentric therewith and within the same, the top of said adjacent screen terminating a substantial distance below said outer screen, a strap extending from the top of said adjacent screen upwardly and outwardly, the end of said strap lying on the top of said outer screen, to permit the removal of said adjacent screen from said outer screen, an inwardly extending annular flange on the lower end of said outer screen, the lower end of said adjacent screen extending below said flange and being nested therein to retain said adjacent screen in position, said strap being fixed at its lower end to the top of said adjacent screen.

10. A filter according to claim 9 characterized in that at least one magnet is suspended in the space between the tops of said inner and outer screens.

11. A filter according to claim 10 characterized in that said magnets are located with the poles thereof adjacent the top of said inner screen.

12. A filter according to claim 10 characterized in that a bar bridges the top of said outer screen, at least one clip is suspended from said bar, and said magnet is held in said clip at the central area of said magnet.

13. A filter according to claim 2 characterized in that a second open-ended keeper is at the upper portion of said second screen, and a second latch enters said second keeper upon relative rotation of said second and third screens.

14. A filter according to claim 2 characterized in that a handle is provided for said filter, a lateral extension on the lower end of said handle entering said keeper to constitute said latch.

15. A filter according to claim 1 characterized in that a handle is provided for said filter, a lateral extension on the lower end of said handle entering said keeper to constitute said latch.

16. A filter according to claim 1 characterized in that a flanged imperforate ring is attached to the bottom of said outer screen, said inner screen having its lower end nested in said ring.

References Cited

UNITED STATES PATENTS

| | | | |
|---|---|---|---|
| 329,505 | 11/1885 | Teeter | 210—474 |
| 841,134 | 1/1907 | Ferguson | 210—474 X |
| 1,115,379 | 10/1914 | Bessent | 210—474 X |
| 1,625,024 | 4/1927 | Hall | 210—341 |
| 1,786,500 | 12/1930 | McGonigal | 210—474 |
| 2,366,451 | 1/1945 | McNeal | 210—223 |
| 2,459,534 | 11/1949 | Kennedy | 210—223 |
| 2,792,118 | 5/1957 | Kraissl | 210—453 X |
| 2,914,178 | 11/1959 | Edelen | 210—222 |
| 3,155,613 | 11/1964 | Felix et al. | 210—232 |
| 3,179,253 | 4/1965 | McNeal | 210—315 |
| 3,204,391 | 9/1965 | Schwab | 210—315 X |

FOREIGN PATENTS

| | | |
|---|---|---|
| 640,690 | 5/1962 | Canada. |
| 544,664 | 6/1956 | Italy. |
| 574,313 | 3/1958 | Italy. |

REUBEN FRIEDMAN, *Primary Examiner.*

F. A. SPEAR, *Assistant Examiner.*